United States Patent [19]

Patillet et al.

[11] 4,134,294

[45] Jan. 16, 1979

[54] DEVICE FOR SIMULTANEOUSLY MEASURING VARIOUS PARAMETERS OF THE DRILLING FLUID

[75] Inventors: Jean Patillet, St-Germain-en-Laye; Olivier Issenmann, Lamorlaye, both of France

[73] Assignees: Geoservices, Le Blanc-Mesnil; Societe Nationale Elf Aquitaine (Production), Courbevoie, both of France

[21] Appl. No.: 863,307

[22] Filed: Dec. 22, 1977

[30] Foreign Application Priority Data

Dec. 27, 1976 [FR] France .................................. 76 39136

[51] Int. Cl.² ............................................ E21B 47/10
[52] U.S. Cl. .......................................... 73/153; 73/155
[58] Field of Search ........................... 73/153, 151, 155

[56] References Cited

U.S. PATENT DOCUMENTS

| 2,923,151 | 2/1960 | Engle et al. | 73/153 |
| 3,514,996 | 6/1970 | Coustau | 73/153 |

*Primary Examiner*—Jerry W. Myracle
*Attorney, Agent, or Firm*—Burgess, Ryan and Wayne

[57] ABSTRACT

A device for simultaneously measuring various parameters such as the flow rate, the density and the temperature of the drilling mud issuing from a well during the drilling operation, and for recording said parameters, comprising a V-shaped measuring conduit the upstream portion of which is connected to the upper portion of a chute through which said mud flows and which opens into the atmosphere, while the downstream end of said measuring conduit is connected to a down spout directing said mud to oscillating screens.

6 Claims, 15 Drawing Figures

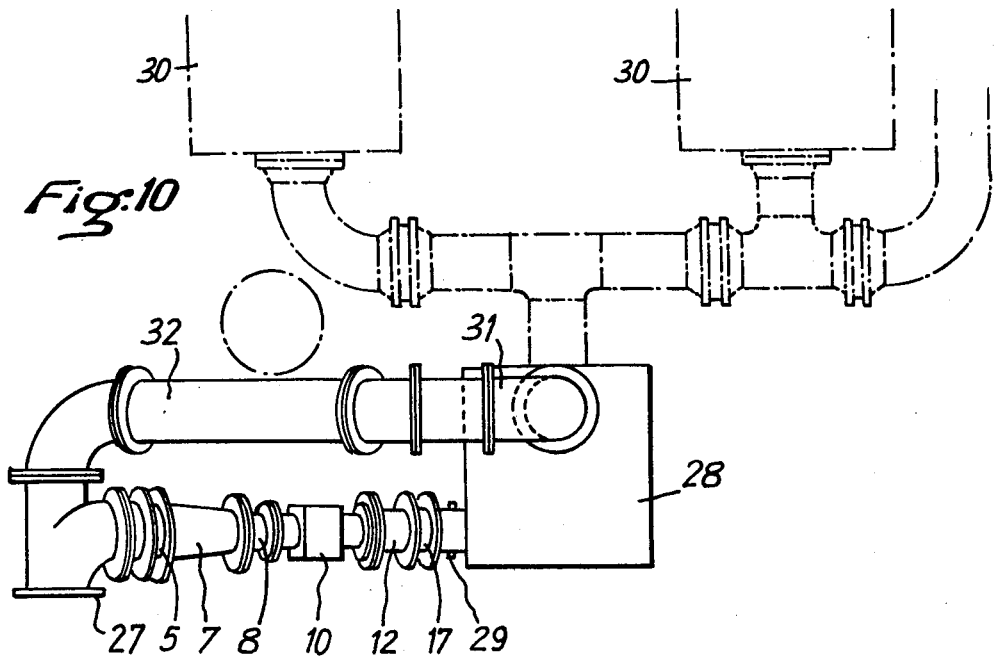
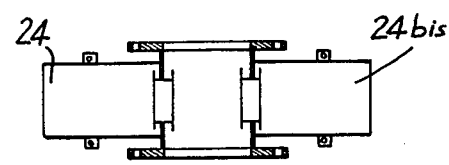
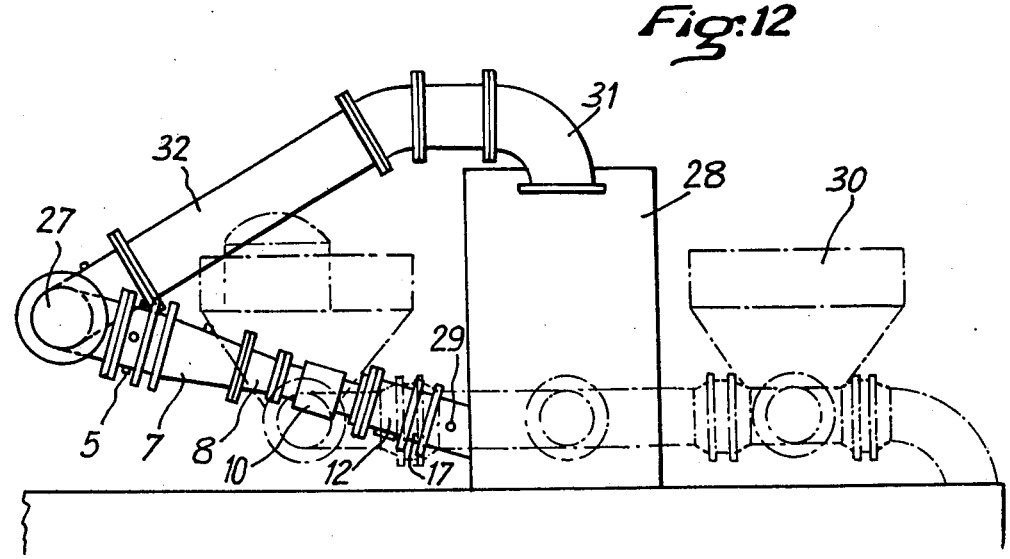

DEVICE FOR SIMULTANEOUSLY MEASURING VARIOUS PARAMETERS OF THE DRILLING FLUID

The present invention relates to a device for simultaneously measuring various parameters of a fluid issuing from a well during the drilling operation, such as the flow rate of said fluid, its density and its temperature, and for controlling, on the basis of the thus measured parameters the fluid losses and increases which are detrimental to the equilibrium of the operating conditions of the well.

It is known that when drilling a well, a fluid — often called "drilling mud" — is permanently injected into the drilling pipe assembly from the ground surface, said fluid, or mud, flowing downwardly to the bottom of the well, where it passes through the recesses defined by the bore bit and then flows upwardly toward the ground surface through the annular space defined between the drilling pipe assembly and the wall of the well, whereafter said fluid returns to the ground surface where it is sifted with a view to eliminating the stony refuse material carried by the ascending fluid, the latter being finally reintroduced into the conventional storage tanks.

It is an essential object of the present invention to provide a device for detecting and measuring the possible exchange of fluid between the drilling mud flowing through the annular space of the well, on the one hand, and the permeable zone of the ground through which said drilling mud flows, it being well understood that said fluid exchange may occur in two directions:

(1) the drilling mud may penetrate the permeable layers of the ground, which results in mud losses, thus in fluid losses;

(2) eruption into the well of fluids contained in the porous space of the permeable base; these fluids may comprise formation water, oil or gas, or by a mixture of the same; in this case a "mud increase" occurs.

The existence and the direction of such exchanges depend, on the one hand, on the presence of permeable layers through which the fluids may pass, and, on the other hand, on the difference between the pressure of the mud in the annular space of the well and the so-called "formation pressure" of the fluids in the pores of the ground through which the latter will pass. If this differential pressure has a positive value, a loss of mud may occur, whereas if said differential pressure has a negative value, an eruption or "wild flowing" may take place.

The detection and the measuring of such exchanges is important during the drilling operation for the following reasons:

(1) the occurrence of an exchange provides evidence of the presence of a porous and permeable layer, and the direction of the exchange (loss or increase) provides information relative to the rate of the pressures prevailing in the well, and thus information relative to the formation pressure;

(2) the fluid losses and fluid increases are detrimental to the operating equilibrium of the well and may, under certain circumstances, create dangerous situations; consequently it is important to detect rapidly any variation, even those of reduced magnitude, of the above-mentioned parameters.

According to the conventional method the losses and increases are controlled by permanently recording the volume of the mud in the storage tanks located on the surface of the ground, which are part of the circuit of the well, on the basis of the results of the measure of the respective levels in each one of said tanks. This method which is simple and in many cases proves to be efficient has nevertheless a frequently occurring drawback due to the various treatments applied to the drilling mud. These treatments change the volume of said mud independently of the characteristics of the well. Such treatments may comprise addition of water or other treating products, filtration of the stoney particles, transfer of fresh mud etc. Furthermore, when the drilling operation is performed at sea from a barge floating on the water surface and thus submitted to the surge, the surface of the drilling mud in the storage tanks is agitated thus the measurements of the mud level become comparatively inaccurate.

The device according to the present invention allows the simultaneous measuring of the following data:
the differential flow rate of mud in the well, i.e. the difference between the flow rate of the mud injected into the inlet of the drilling pipes and the flow rate of the mud issuing from the annular space at the head of the well; this difference is nil when the well operates under equilibrium conditions, while any other value (different from nil) indicates a loss or an increase, depending on the sign of said value;
the density of the drilling mud;
the temperature of the mud.

The device according to the invention further comprises a system for establishing the difference between the two measured flow rates, as well as means for recording all the measured values.

The measurement of the inlet flow rate does not raise any particular problem, since the circulated mud flows through a conduit under pressure which can be provided with a flow-meter in a manner known per se; usually this flow-meter will be of the electromagnetic type. This known system does not comprise any moving mechanical element, but includes only two electrodes which are in contact with the drilling mud and which do not at all obstruct the circular flow section of the mud; an externally produced magnetic field perpendicular, on the one hand, to the axis of the two electrodes, and on the other hand to the direction of flow produces between said two electrodes an electric potential difference proportional to the average flow velocities of the stream veins in the flow section, i.e. proportional to the flow rate of the liquids.

On the other hand, at the outlet of the well, the drilling mud is subjected to atmospheric pressure and generally flows under atmospheric conditions toward the oscillating screens and the storage tanks, so that a separate device is required for measuring the flow rate during this operating phase.

The device according to the present invention comprises an assembly, or installation, which allows an electromagnetic flowmeter to be placed into the flow of mud issuing from the well, said flow-meter being able to operate normally, i.e. when the section of the flow-meter is entirely filled with drilling mud, without any atmospheric air bubbles being carried along, the average flow velocity being comprised between the limits of the measuring capacity of the flow-meter, while preventing the stony refuse material carried upwardly by the drilling mud from sedimenting and obstructing entirely or partially the flow path of the mud, said device defining nevertheless an emergency passage for the mud in case an operation has to be effected on the measuring device.

The device according to the invention further comprises means for measuring the density of the drilling mud by a gamma-ray densimeter as well as means for measuring the temperature by a resistance sonde.

The invention will be described in a more detailed manner herein below with reference to the appended drawings which are given by way of illustration but not of limitation.

FIG. 4 shows a double gate system for controlling the flow of the drilling mud from the chute to the V-shaped tube.

FIG. 5 shows an anti-vortex grid.

Figure 6A:
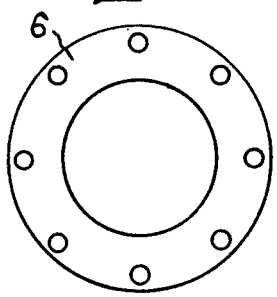
Figure 6:
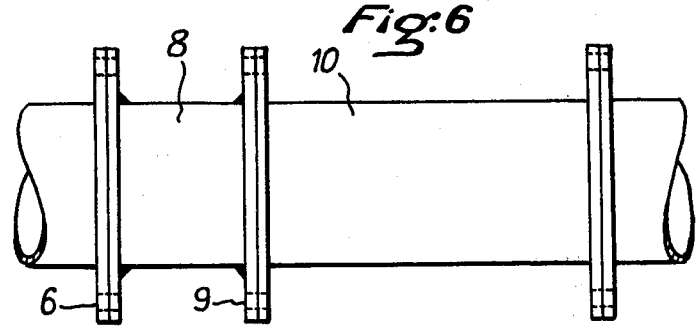
Figure 7A:
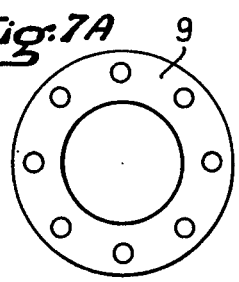
Figure 7:
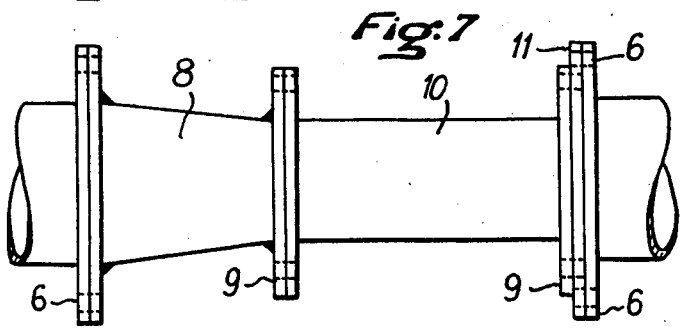
Figure 8A:
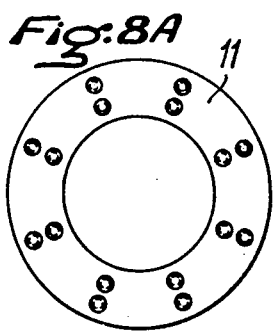
Figure 8:
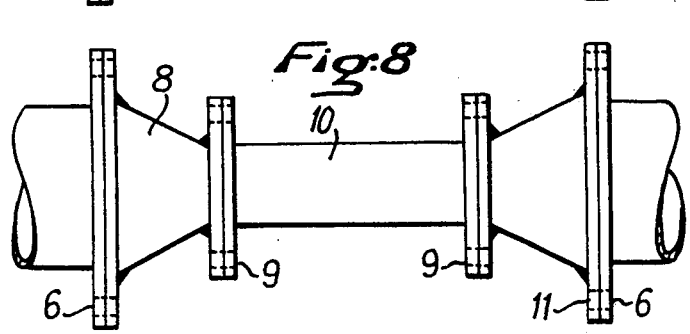

FIGS. 6, 7 and 8 respectively illustrate three various methods of connecting the flow-meter to the V-shaped tube, FIGS. 6A, 7A and 8A respectively show the flanges used for the connections of FIGS. 6, 7 and 8.

FIG. 9 illustrates the arrangement of the gamma ray flow-meter

Figure 11:
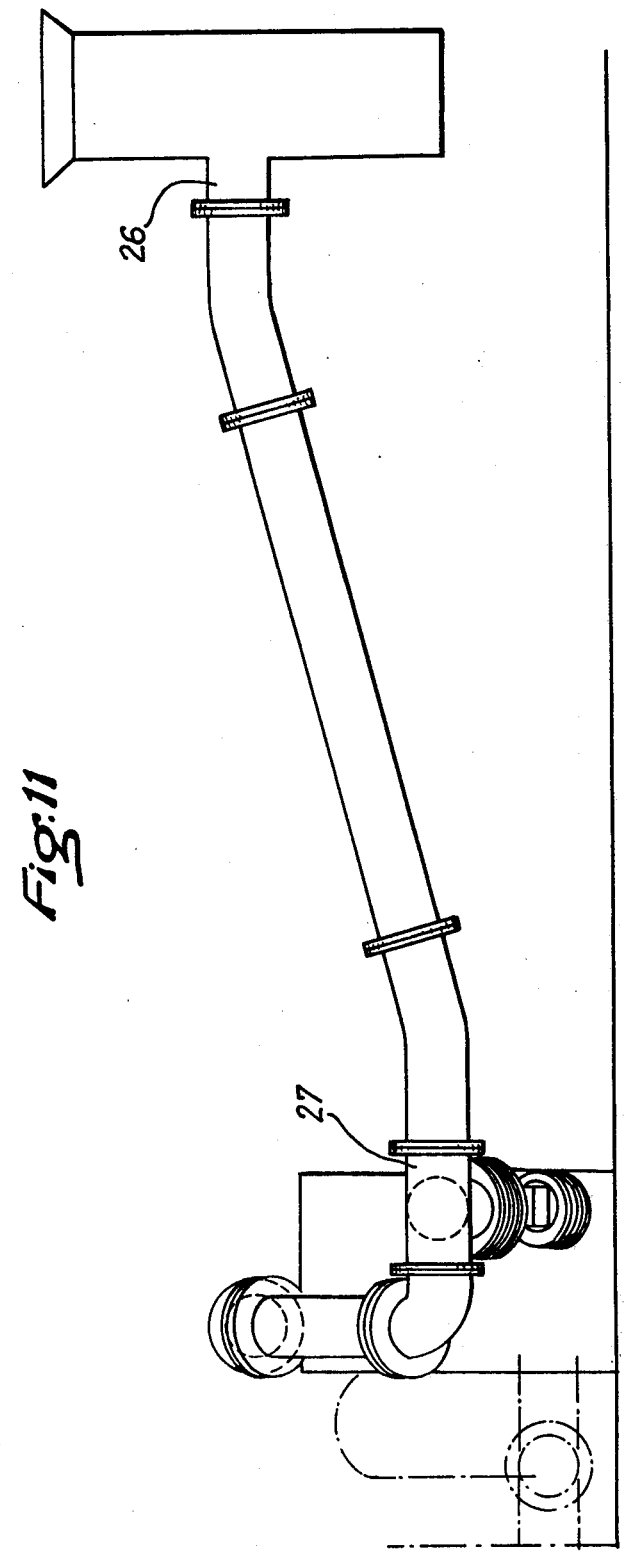

FIGS. 10, 11 and 12 are plane and elevational views, respectively, showing one embodiment of the device according to the invention adapted for use in offshore drilling operations.

Figure 1:
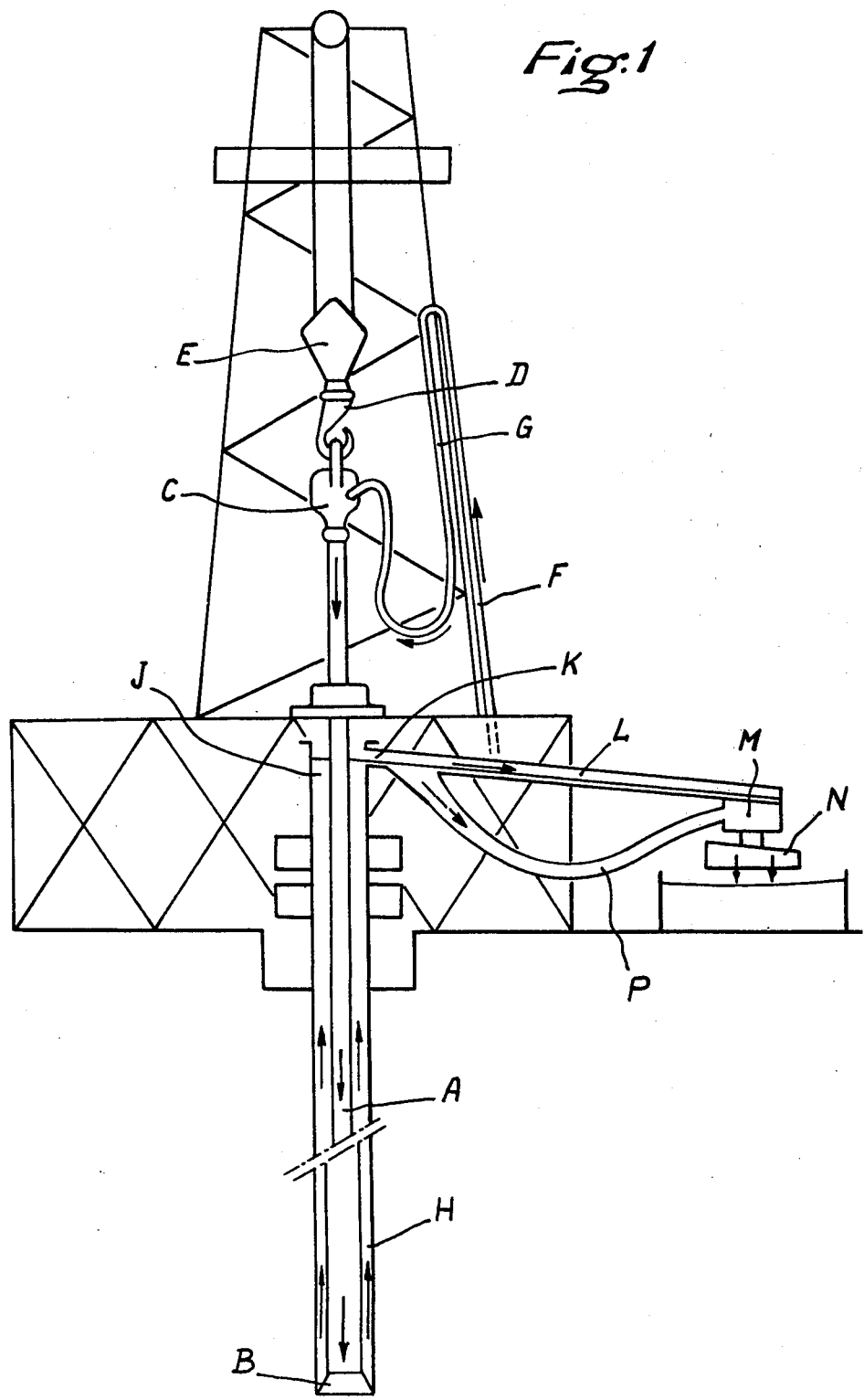
FIG. 1 shows schematically a well installation during the drilling operation, and represents the locations of the various conventional elements of the drilling mud circuit.

FIG. 1 shows a conventional derrick comprising a drilling pipe assembly A provided at its lower end, the bottom of the well, with a drill B, and at its upper end with an injection head C suspended at the hook D of a movable block E; the drilling mud is injected into injection head C through an ascending conduit F and a flexible conduit C, said mud being transported by pumps (not shown) which are located at the upstream side. The mud flows downwardly within the drilling pipe assembly, passes through the recesses defined by the drill and then flows upwardly through an annular space H towards the head J of the well, whereafter said mud flows though a so-called "well-pipe" K into a conduit or "chute" L opening into the atmosphere. Chute L is connected to a down spout M which feeds one or more oscillating screens N.

Figure 2:
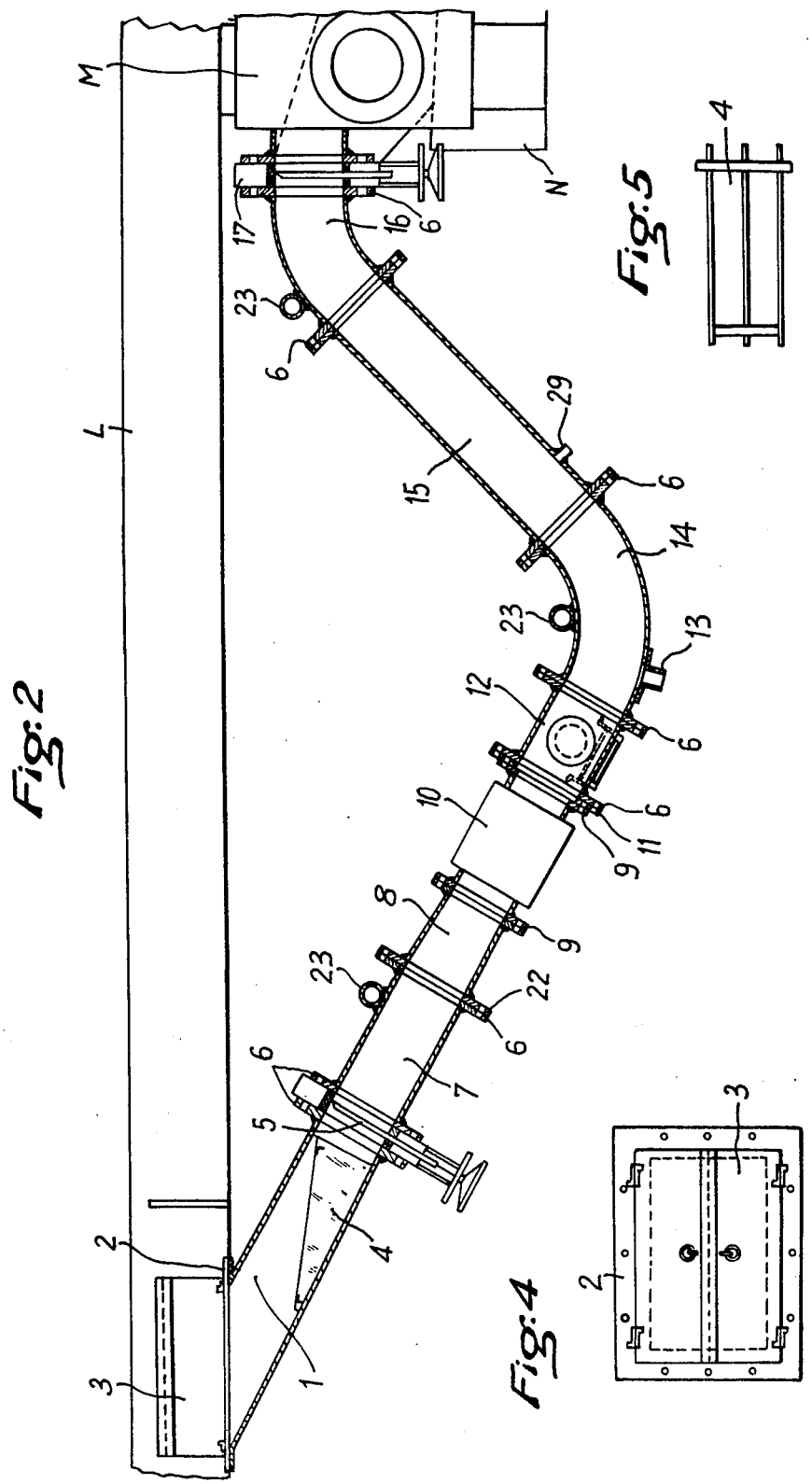
FIG. 2 shows an embodiment of the invention which is adapted to be applied to the drilling mud outlet circuits provided with a conduit or "chute" opening into the atmosphere and connected to a V-shaped tube which contains the measuring apparatus or implements.

FIG. 2 shows in detail the novel device added to the conventional installation with a view to allowing measuring pick-ups to be mounted in a chute such as L. This novel device is schematically indicated by a by-pass conduit P shown in FIG. 1.

The system shown in FIG. 2 comprises a by-pass conduit added to a conventional circuit and allowing feeding and filling of conventional measuring devices through which the entire flow of mud passes; while the conventional flow-path through the chute is maintained in order to serve as an emergency flow-path.

Figure 3:
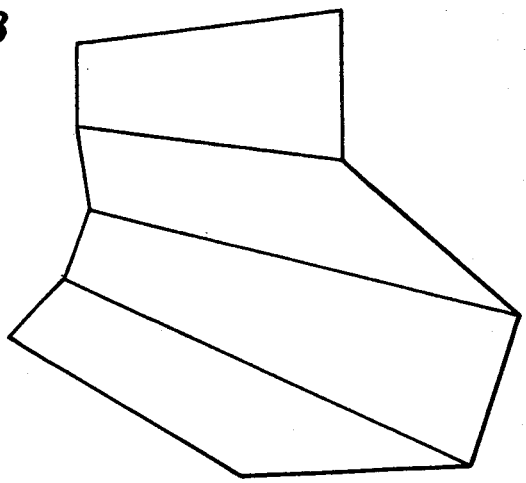
FIG. 3 shows the developed area of the pyramidal conduit connecting the chute to the V-shaped tube.

The system comprises a V-shaped tube connected at its upstream end to the upper portion of chute L, and at its downstream end to the down spout M located above the oscillating screens N. The connection to the flat bottom of the upstream portion of the chute is accomplished by means of a pyramid-shaped conduit 1 the developed area of which is shown in FIG. 3.

At the point of connection with the chute, a double-gate system 3 having rings mounted onto frame 2 (cf. FIG. 4) allows at will the flow of drilling mud in chute L to be maintained, or — by opening the gates — causes the entire mud flow to pass through the measuring system. In the pyramidal connection 1 a grid (cf. FIG. 5) constituted by three straight strips is provided for preventing the formation of vortex.

The measuring conduit comprises, as viewed from its upstream end toward its downstream end, a gate valve 5 which might be advantageously replaced by a remote control pneumatic drop shutter valve; this valve allows the reducing of the flow velocity of the mud, if desired, with a view to preventing atmospheric air being carried along at the inlet of the tube. Downstream of the above-mentioned valve, tube 7 comprises a standard cylindrical tube having an inner diameter of 20 cm for example.

An electromagnetic flow-meter 10 is located downstream of valve 5 and comprises a conical adapter segment 8. As shown in FIG. 2, the flow-meter in the present embodiment has an effective mud through-flow diameter of 15 cm. Depending on the flow-rate of the drilling mud, and thus on the mud circulation rate, it might be advisable to provide flow-meters having a larger through-flow diameter (20 cm), or a smaller through-flow diameter (10 cm) so that the flow velocity of the mud is maintained within the limits of the measuring capacity of the flow-meters. To this end, it is possible to provide three different models of segment 8, so as to enable the user to mount any one of the above-mentioned types of flow-meter, while maintaining the initial distance between flanges 6 and 11. FIGS. 6, 7 and 8 show various types of segments such as 8 which are adapted to be connected to flow-meters having a diameter of 20, 15 and 10 cm, respectively.

FIGS. 6A, 7A and 8A show flanges 6, 9 and 11, respectively.

The measuring conduit further comprises a segment 12 allowing a gamma ray densimeter such as the one shown in FIG. 9 in plan view to be adapted to it. As shown in the drawing, a radiation source 24 and a detector 24 bis for capturing the radiation after the latter has crossed the wall of the tube are fixed outside the tube and coaxially to each other, on two opposed sides of the tube.

The lowermost portion of the measuring conduit is constituted by segment 14 which is curved at an angle of 65° to 75°, the axial radius of curvature having a length of 400 mm. This segment, as well as segments 7 and 16, is provided with a ring 23 allowing the fixing of the described device to the drilling apparatus. Segment 14 further comprises a hole 13 adapted to receive a threaded plug which allows the base of the syphon formed by the V-shaped tube to be emptied and cleaned.

The upwardly extending portion of the V-shaped tube comprises a segment 15 comprising an aperture 29 adapted to receive a packing allowing a temperature sonde to be introduced.

Segment 16, which is curved according to an angle of 30° to 35° and to an axial radius of curvature of 400 mm, directs the drilling mud horizontally into down spout M though a second control valve 17; the mud is then transmitted to the oscillating screens.

The above described device is mainly adapted to be associated to sondes having an open through-flow conduit (chute), which arrangement is the most frequently encountered in drilling operations on the ground. In the case of offshore drilling operations the flow from the well head is very often directed through a closed conduit. FIGS. 10 to 12 show a device according to the invention allowing the same measuring devices to be interposed in the downwardly extending portion of a V-shaped tube, whereas the upwardly extending portion thereof is constituted by a parallelepipedic reservoir from which the drilling mud flows toward the oscillating screens. FIG. 10 is a plan view of the device, while FIGS. 11 and 12 are side or elevational views of the same.

From the down spout of the well head 26 the drilling mud flows through a 20 cm standard conduit to the inlet of the device 27. The downwardly extending portion comprises a valve 5, as in the preceding embodiment; a conical adaptor segment 8 having a convenient diameter at its inlet and outlet ends, a flow-meter 10, a segment 12 comprising a gamma ray densimeter, a second control valve 17 and a temperature sonde 29 downstream of which said downwardly extending portion opens into reservoir 28 from which the drilling mud flows towards the down spout or spouts 30 associated to the oscillating screens.

The ascending tube 32 and the down spout in reservoir 28 constitute an emergency by-pass circuit.

It should be well understood that the invention is by no means limited to the embodiments described herein above and shown in the appended drawings; indeed, numerous modifications and variants may be envisaged by any person skilled in the art without departing from the spirit of the invention as claimed in the appended claims.

What is claimed is:

1. A device for simultaneously measuring various parameters such as the flow rate, the density and the temperature of the drilling mud issuing from a well during the drilling operation, and for recording said parameters, said device comprising a V-shaped measuring conduit the upstream portion of which is connected to the upper portion of a chute through which said mud flows and which opens into the atmosphere, while the downstream end of said measuring conduit is connected to a down spout directing said mud to oscillating screens, said measuring conduit comprising successively in its downwardly extending portion:
   a connecting segment having a pyramidal shape for connecting said measuring conduit to said chute, said connecting segment containing an anti-vortex grid;
   a control valve for controlling the flow velocity of the mud so as to prevent atmospheric air from entering said measuring conduit;
   a standard cylindrical tubular segment;
   a connecting segment adaptable to the limits of the measuring capacity of a flow-meter;
   a flow-meter;
   a gamma ray absorption densimeter;
   a segment allowing said gamma ray absorption densimeter to be mounted onto said measuring conduit;
   a curved segment having a predetermined curvature connected to the upwardly extending portion of said V-shaped conduit;
   a thermometric sonde;
   a segment having a hole adapted to receive a packing allowing said thermometric sonde to be introduced therein;
   a curved segment, the angle of curvature of which is complementary to that of the lower segment, which directs the mud horizontally to the down spout.

2. The device according to claim 1, wherein the flow-meter used for measuring the outlet flow rate of the mud comprises an electromagnetic flow-meter the entire section of which is filled with mud free of air bubbles and stony refuse matter due to the provision of said anti-vortex grid in the pyramidal connecting segment and to said control valve provided upstream of the segments connected to said flow-meter.

3. The device according to claim 1, wherein the axis of said pyramidal connecting segment to said chute forms an angle of 30° with the horizontal bottom of said chute.

4. The device according to claim 1, wherein the lowermost portion of said V-shaped conduit is constituted by a segment which is curved so as to form an angle of 65° to 75°, the axial radius of curvature having a length of 400 mm.

5. The device according to claim 1, wherein the curved segment located in the downstream portion of said V-shaped tube has a curvature defining an angle 30° to 35° and an axial radius of curvature of 400 mm.

6. A method for controlling the fluid losses in a production well which comprises measuring the flow of mud into a well and measuring the flow of mud returning from the well by passing the flowing mud through a control valve for controlling the flow velocity of the mud and preventing atmospheric air from entering the measuring conduit; passing said mud from said control valve through a flow meter for measuring the flow of said mud; passing said mud through a gamma ray absorption densimeter to determine the density of said mud and measuring the temperature of said flowing mud with a temperature monitoring means and comparing the flow of the mud exiting from the well with the flow of the mud entering the well to determine the fluid losses.

* * * * *